United States Patent [19]
Cho

[11] 3,766,655
[45] Oct. 23, 1973

[54] INTERNAL-MEASURING INSTRUMENT FOR BORES AND THE LIKE HAVING SELF-CENTERING MEANS IN ADDITION TO THE MOVABLE PROBE

[76] Inventor: Antonio Cho, Feldblumenweg 47, 8048 Zurich, Switzerland

[22] Filed: Feb. 24, 1971

[21] Appl. No.: 118,358

[52] U.S. Cl. ............................................. 33/178 R
[51] Int. Cl. ............................................. G01b 5/12
[58] Field of Search ............... 33/178 R, 164 C, 33/143, 167, 166, 147

[56] References Cited
UNITED STATES PATENTS

| | | | |
|---|---|---|---|
| 1,463,673 | 7/1923 | Clase | 33/164 C |
| 2,775,820 | 1/1957 | Worthen | 33/178 R |
| 1,591,258 | 7/1926 | Ames | 33/147 K |
| 3,120,061 | 2/1964 | Pflederer | 33/166 |

Primary Examiner—Harry N. Haroian
Attorney—Karl F. Ross

[57] ABSTRACT

An internal-measuring instrument for measuring the internal diameter of bores and the like in which an upright spindle rotates a threaded member to drive a movable probe against the wall of a bore while bringing a fixed body into abutment with the diametrically opposite portion of the wall. Replaceable spring-loaded arms on the stationary body form outriggers therefore to center the device automatically by a three-part system. The displacement of the movable probe is registered on the barrel of the instrument to indicate the measured dimensions.

2 Claims, 14 Drawing Figures

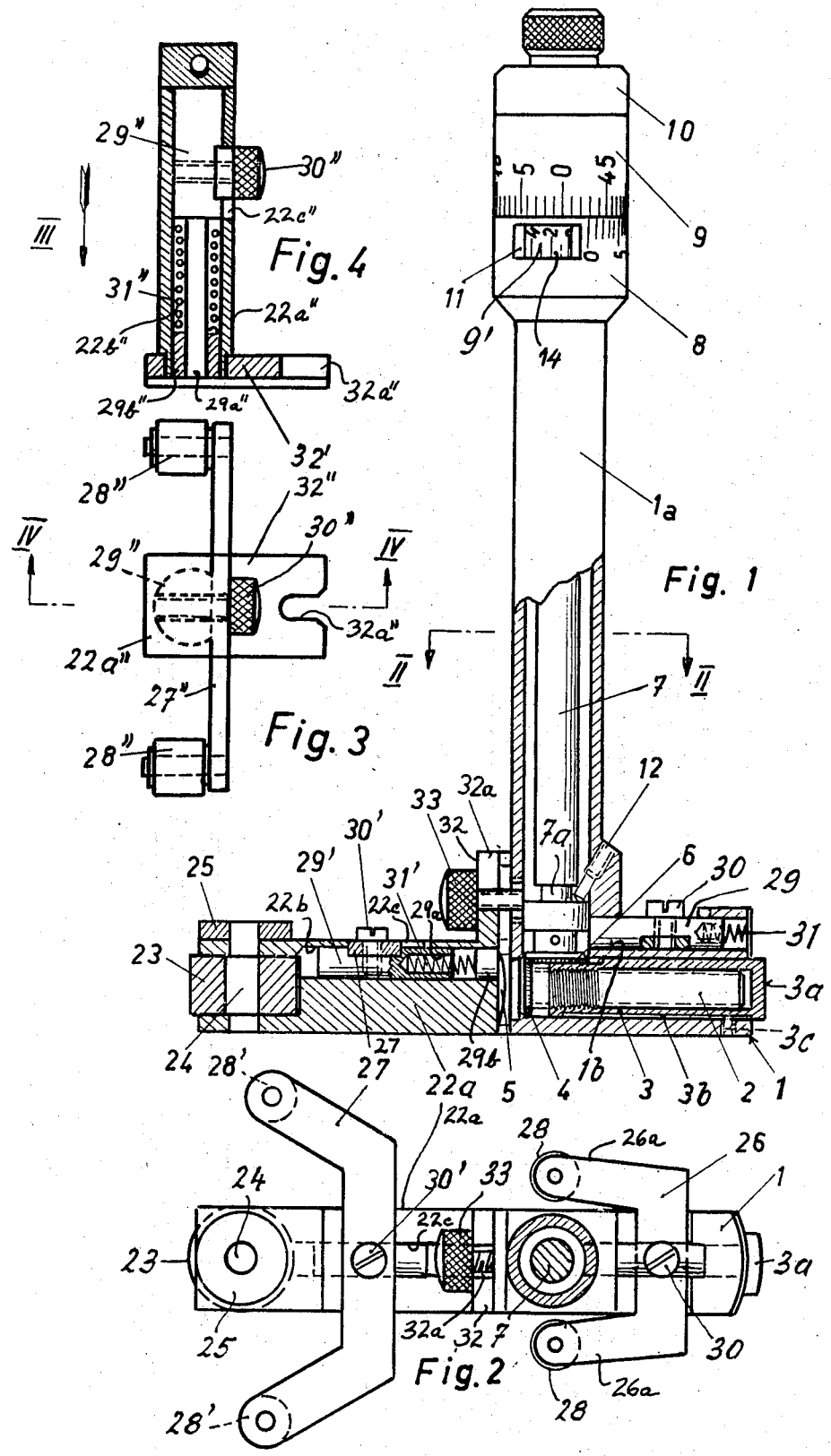

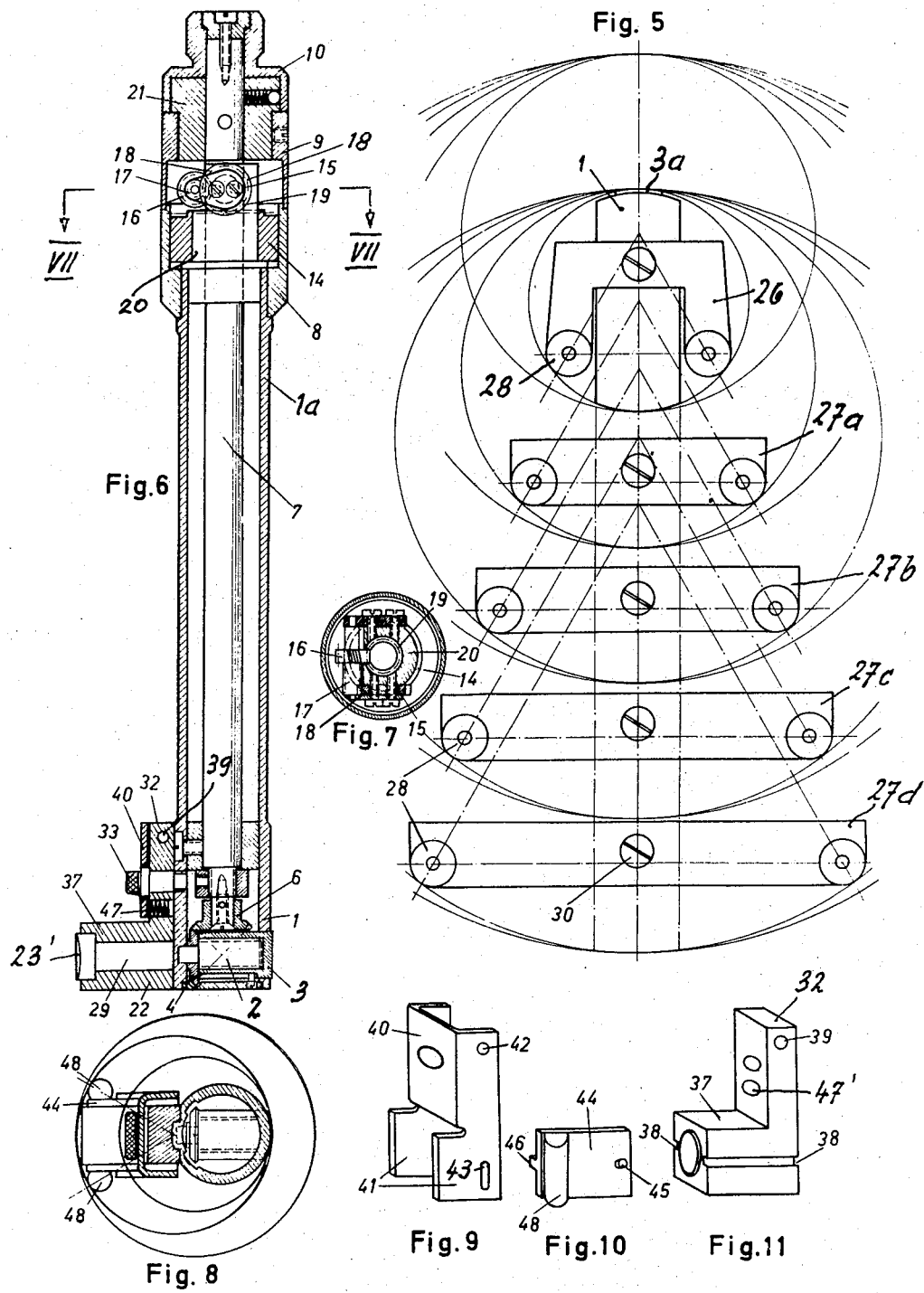

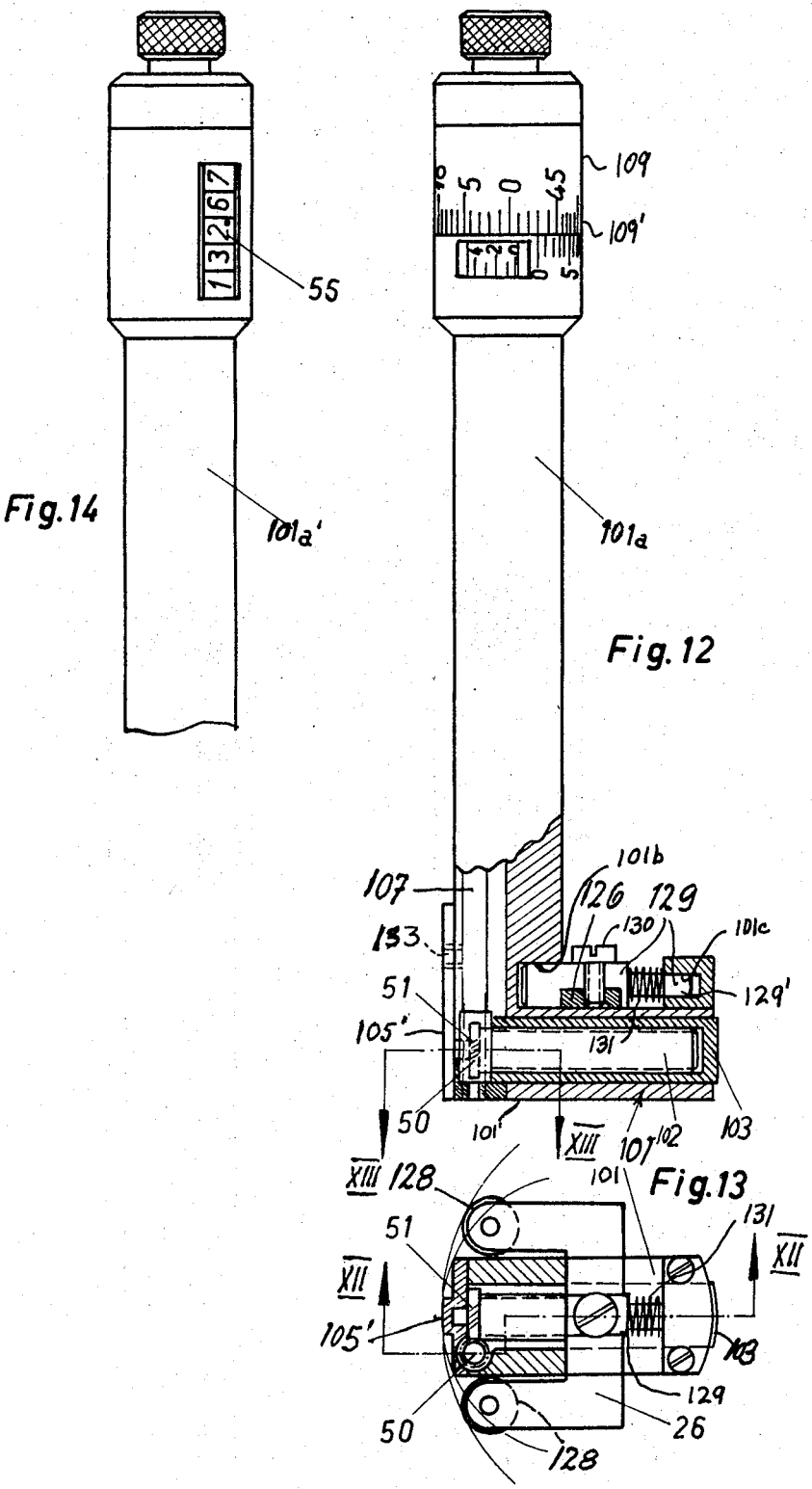

INTERNAL-MEASURING INSTRUMENT FOR BORES AND THE LIKE HAVING SELF-CENTERING MEANS IN ADDITION TO THE MOVABLE PROBE

BACKGROUND OF THE INVENTION

In technology the opinion is generally held that the most accurate and ideal internal measuring system should be one using three probes. If the principle is examined closely, it becomes clear that this is a fallacy for every moving probe constitutes a source of error, so that a three-probe system has three times as many sources of error as an instrument with only one moving probe. Special attention must be devoted to the drive system for the measuring movement. In general the measuring movement of this kind of inside measuring instrument is based on cone taper. The greater the taper, the wider the measuring range, but the lower the accuracy of measurement. Moreover the transmission ratio with which the cone movement is converted into a readable form must also be taken into account, since the smaller the cone motion, the greater the transmission ratio required — with commensurate increase in error. This disadvantage applies also to the dial gauge. The only advantage of a three-probe measuring system is that centering is accomplished automatically, and this is absolutely essential for inside measurements. Apart from the disadvantage of multiple sources of error of the three-probe instrument, there is the still more serious drawback of the difficulty in guiding the moving probe. Consequently this system has a very limited measuring range, and the moving probes cannot be lengthened on account of the difficulty in guid-ing them.

Inside measuring instruments known heretofore with only one moving probe in combination with stationary extension sets have been based on gear transmissions constituting a major source of error. This unsatifactory measuring movement is made readable by means of a dial gauge, which again is based on gear transmission. This twofold source of error is greatly magnified by the gears and also by the pointer of the dial gauge, resulting in poor accuracy. Furthermore instruments of this kind lack satisfactory and effective selfcentering, because the same centering support is used for both large and small bores, i.e. the support does not have the right proportions.

SUMMARY OF THE INVENTION

The inside measuring instrument according to the present invention has been devised in order to obviate all these shortcomings. Its principal feature is the moving probe consisting of a threaded pin and a threaded sleeve, combinable with interchangeable self-centering extension probes the measuring movement of the movable probe is transmitted by gears and a spindle to the graduated drum on the measuring shank. With this system the measuring movement is based on a micrometer with a taper of about 1°, whereas a taper many times this amount is employed on the familiar three-probe systems. Consequently the new system measures more accurately. In addition, however, any number of stationary extension probes with individual self-centering may be used with it, so that the measuring range is virtually unrestricted. Every probe has its own self-centering device, with the length of the centring arms proportional to the width of the bore so as to assure effective centering. Thus the sole advantage of the three-probe system is equalled.

Another feature of the invention resides in the self-centring device which including a balanceable lever, which is very easy to produce and furthermore yields an accuracy incomparably superior to that of the other systems.

DESCRIPTION OF THE DRAWING

The accompanying drawing shows several embodiments incorporating the invention.

In the drawing:

FIG. 1 shows a general view of the instrument with one type of extension probe, partly in axial section;

FIG. 2 is a sectional view of the instrument of FIG.1, along line 11—11 of FIG. 1;

FIG. 3 is a front elevation of a different type of extension probe in the direction of arrow IV of FIG. 4;

FIG. 4 is a sectional view of the extension probe shown in FIG.3;

FIG. 5 is a schematic representation of the self-centering devices for different bore sizes (using the instrument of FIG. 1);

FIG. 6 is an axial section through an instrument for a narrow measuring range;

FIG. 7 is a sectional view on the line VII—VII of FIG.6, showing the arrangement of the gears working in conjunction with the helical gear on the spindle;

FIG. 8 is a top view of the instrument illustrated in FIG.6, partly in cross section;

FIGS.9 – 11 are perspective views which show various details in diagrammatic representation of the embodiment as in FIGS.6 – 8;

FIG.12 is an overall view, partly sectioned along line XII—XII of FIG. 13, of an instrument using a different mechanism to transmit the movement of the probe to the graduated drum;

FIG.13 is a top view of the device of FIG.12, partly sectioned (along line XIII—XIII of FIG. 12) and FIG.14 shows the top part of another instrument with a counter indicating the reading of the device.

SPECIFIC DESCRIPTION

In FIGS. 1 and 2 the inside measuring instrument of the invention is shown to have probe members 2, 3 and 5, transmission members 4 and 6, a spindle 7 and a reading arrangement 8 – 10. All these parts are accommodated in a housing (FIG. 1) 1. The inside micrometer of FIG. 1 has a wide measuring range, e.g., is a basic model for a diameter range of 50 to 60 mm. By means of extension probes the measuring range can be increased practically without limit. The embodiment shown in FIG.6 is an inside micrometer with a smaller measuring range, e.g. 20 – 50 mm bore diameter, employing extension probes. Still smaller measuring ranges can be obtained on the same basic principle.

The nonreplaceable probe element includes a threaded pin 2 and a threaded sleeve 3 while a counter-probe 5 (5' in FIG.13) is provided on the housing diametrically opposite the nonremovable probe 2, 3. The threaded pin 2 is joined to a bevel gear wheel 4 FIG. 1 which meshes with the bevel gear wheel 6 fixedly mounted on a spindle 7. Spindle 7 is joined in turn to the graduated drum 9, so that rotation of the drum relative to its barrel 1a entrains bevel gears 6 and 4 together with threaded pin 2. The threaded sleeve 3 is axially displaceably mounted in a bore of the housing receiving the probe members 2, 3. On the bottom of the threaded sleeve is a keyway 3a, in which a shank screw fixed inside the housing engages to guide the sleeve 3, so that the threaded sleeve 3 can perform only a linear movement and cannot rotate. Thus when the threaded pin 2 is rotated in an appropriate direction, the threaded sleeve is gradually advanced out of the housing. The counter-probe 5 also provides an abutment on the left-hand side of the probe housing 1 for threaded pin 2 or sleeve 3.

To measure the internal diameter of a bore, the graduated drum 9 is rotated until the end 3a of the probe sleeve 3 and the counter-probe 5 abut the walls of the bore. The measured result can then be read from the graduated drum. As on an ordinary micrometer, the drum has fine graduations for parts of a millimeter, with each graduation equal to 0.001 mm, so values of 0.001 mm can be read off with the aid of a vernier. The coarse millimeter graduation can be read off through the window 11 in the vernier drum 8.

The fine graduations on the drum or spindle 7 are related is transmitted to the coarse millimeter graduation in the following way (FIGS. 6 and 7): a helical gear wheel 19 is mounted on spindle 7 (FIG.7), and meshes with intermediate gear wheels 15, 16 and 17. A last intermediate gear wheel 18 meshes with a toothed sleeve 14 rotatably mounted on the gear carrier 20. The coarse millimeter graduations 9' are marked on the outer circumference of toothed sleeve 14, and are visible through the window 11. The adjusting screw 12 extending (FIG.1) into annular recess 7a of the spindle 7, engages a wall or shoulder of the recess to act as a stop for spindle 7, preventing axial displacement thereof.

For measuring the diameter of bores beyond the range of the basic model, extension probes can be used in stages as shown in FIG.5. Every extension probe (FIGS.1 - 4) has an offset arm or leg 32, extending parallel to the barrel 1a, and is secured to the housing 1 by a screw 33 received within a notch 32a. Furthermore each extension probe is provided with a self-centring device comprising a balanceable lever 27, a guide pin 29' and a spring 31, the device being displaceably mounted in a guide bore 22b of the extension probe 22a. The two ends of the lever 27 are provided with rollers 28'.

The pin 29' is formed at its end turned toward the housing 1 with an axial bore 29a receiving spring 31' which bears against a seat 29b closing the righ-hand end of bore 22b. The guide pin 29' is thus urged to the right but can yield to the right, a slot 22c in housing 22a accommodating such movement.

When measuring bores the two rollers 28 are forced against the walls of the bore by the spring 31', so that the measuring or probe axis is always held at the center. The lever 27 serves to adjust the position of the rollers 28 automatically and exactly symmetrically to the centerline.

When the extension probe 22a is not in use and bores of smaller diameter are to be measured, a U-shaped arm 26 may be mounted by a screw 30 (FIGS.1 and 2) onto a guide pin 29 which is shiftable in a bore 1b of the housing parallel to the probe 2, 3. The free ends 26a of the arm 26 reach rearwardly, straddle the barrel 1a (see especially FIG.2), and carry rollers 28 adapted to engage the wall of the bore. A spring 31, received in bore 1b, bears upon the guide pin 29 to the left so that the arm 26 of this probe functions identically to arm 27 previously described.

In FIGS. 3 and 4, there is shown a modified extension in which the housing 22a'' has a lug 32'' which can be attached by the screw 33 to the housing via a notch 32a'' in this lug. In this embodiment a rod 29a'' forms a guide for the pin 29'' which carries the arm 27'' via screw 30''. A slot 22c'' allows displacement of the arm and pin while the spring 31'' surrounds the rod 29a'' and bears against the seat 29b'' and the pin 29''. On the centering device for the smaller embodiment (i.e., narrower measuring range) there is arranged a parallel lever 40 instead of the balanceable lever. The two wings 41 of parallel lever 40 (FIG. 9) are each joined to a centering piece 44 and are mounted on extension probe 37 to hinge on the pivots 39 and 42. Each wing 41 is articulated to a centering piece 44, which has a key-shaped rib 46 linearly guided in the keyway 38 of the extension probe. By means of the pins 45 which engage the holes 43, the two centering pieces 44 are made to perform the same parallel movement as the parallel lever 40 hinges. The probe and counter-probe center themselves automatically under the action of the spring 47 and pressure rollers 48.

Instead of using bevel gears 4,6, the measured result from the probe member 2,3 may be transmitted to the spindle 7 and graduated drum 8,9 via helical or worm gears 50 and 51 (FIGS.12 and 13). Alternatively, instead of the scale drum 8,9 the measured result may be transmitted to a counter 56 as indicated in FIG.14.

In FIGS. 12 and 13, therefore, I show an internal machining instrument of the micrometer type wherein the housing 101 comprises a leg 101' and a barrel 101a, the latter receiving a spindle 107 carrying a thimble 109 with graduations 109' from which the reading of the instrument can be made. The spindle 107 drives a worm gear 50 meshing with a worm wheel 51 which is connected to the pin 102 threaded into sleeve 103, the latter being guided for axial movement without being rotatable. When the spindle 107, therefore, is rotated, the pin 102 is likewise rotated to advance the sleeve 103 from the housing as previously described. The housing 101 is formed with a bore 101b within which a pin 129 is axially shiftable as guided by a rod portion 129' of this pin received in a further bore 101c axially aligned with bore 101b. A screw 130 attaches an arm 126 carrying rollers 128 to the pin 129. A spring 131 mounted on the rod 129', biases the arm 126 to the left so that the arm may yield against the force of the spring 131. A face 105' of the counterprobe is used to bear against the wall of the bore opposite the point at which the probe 103 acts thereon. In FIG.14, the counter 55 is substituted for the vernia arrangement of FIGS. 12 and 13.

The system of FIGS. 12 - 14, of course, operates in the manner previously described in connection with FIG.1, the extension probe having been removed and the threaded bore 133 into which the screw for attaching the extension probe fits, is shown here to be empty.

From the drawing it will also be apparent that the fixed body 22, to which the barrel is attached, engages the wall of the bore diametrically opposite the contact point of threaded sleeve 3 (movable probe) either by a roller 23 (FIG.1) or a contact portion 5' (FIG.12) as the movable probe is brought into contact with the bore by rotation of spindle 7. The replaceable centering arms 27a and 27d (FIG.5) are mounted upon a guide bolt 29 by a screw 30 which also acts as a fulcrum for the lever so that the latter is self-balancing or pivotal about this fulcrum. Member 29 is biased to the left (FIG.1) by a spring means 31, e.g., the spring shown in FIG.13, while the screw 33 secures a lug 32 of the stationary member 22 to the barrel. The roller 23 is journaled on a pin 24 held in place by the plate 25. The pin 24 is eccentric as is also apparent from FIG.1 to facilitate centering. From FIGS. 6 – 11 it will also be apparent that the centering device of the probe 37 includes a pivotal lever 40 which is hinged to two slides 44 guided in grooves 38 of the probe so that the slide 44 can move parallel to the axial movement of probe 3.

I claim:

1. An internal measuring instrument for the measurement of the internal diameter of an opening, comprising:
   a. A probe housing of generally L-configuration having a leg and a barrel extending perpendicularly to said leg, said leg being formed with a bore;
   b. a first probe axially shiftable in said bore and engageable with a wall of said opening at one side thereof;
   c. a spindle rotatable in said barrel;
   d. transmission means in said housing operatively connecting said spindle with said first probe for axially shifting said first probe relatively to said housing in the direction of said side of said opening, said housing being formed with a second probe diametrically opposite said first probe and engageable with an opposite side of said housing;
   e. indicating means on said housing cooperating with said spindle for registering displacement of said first probe;
   f. a guide on said leg axially shiftable parallel to the direction of displacement of said first probe;
   g. a first arm extending transverse to said direction and mounted on said guide for displacement in said direction, said first arm being formed with rollers engageable with the wall of said opening;
   h. first spring means on said housing yieldably biasing said arm in a direction opposite to the direction of displacement of said first probe; and
   i. an extension probe removably and replaceably mounted on said housing along a side thereof opposite said first probe, said extension probe including a body detachably affixed to said housing in line with said other probe and engageable with said opposite side of said opening, a second guide axially shiftable on said body in said direction, a second arm extending transversely to said direction and having free extremities engageable with the wall of said opening for centering the instrument relative thereto, and second spring means on said body for biasing said second arm in said opposite direction.

2. The instrument defined in claim 1 wherein said free ends of said second arm are provided with respective pressure rollers, said body being formed at its end engageable with said other side of said opening with an eccentrically journaled row.

* * * * *

UNITED STATES PATENT OFFICE
CERTIFICATE OF CORRECTION

Patent No. 3,766,655     Dated 23 October 1973

Inventor(s) Antonio CHO

It is certified that error appears in the above-identified patent and that said Letters Patent are hereby corrected as shown below:

In the heading, after line [21] insert:

-- [30] Foreign Application Priority Data

26 February 1970   Switzerland   No. 3738/70 --

Signed and sealed this 4th day of June 1974.

(SEAL)
Attest:

EDWARD M. FLETCHER, JR.
Attesting Officer

C. MARSHALL DANN
Commissioner of Patents